United States Patent Office.

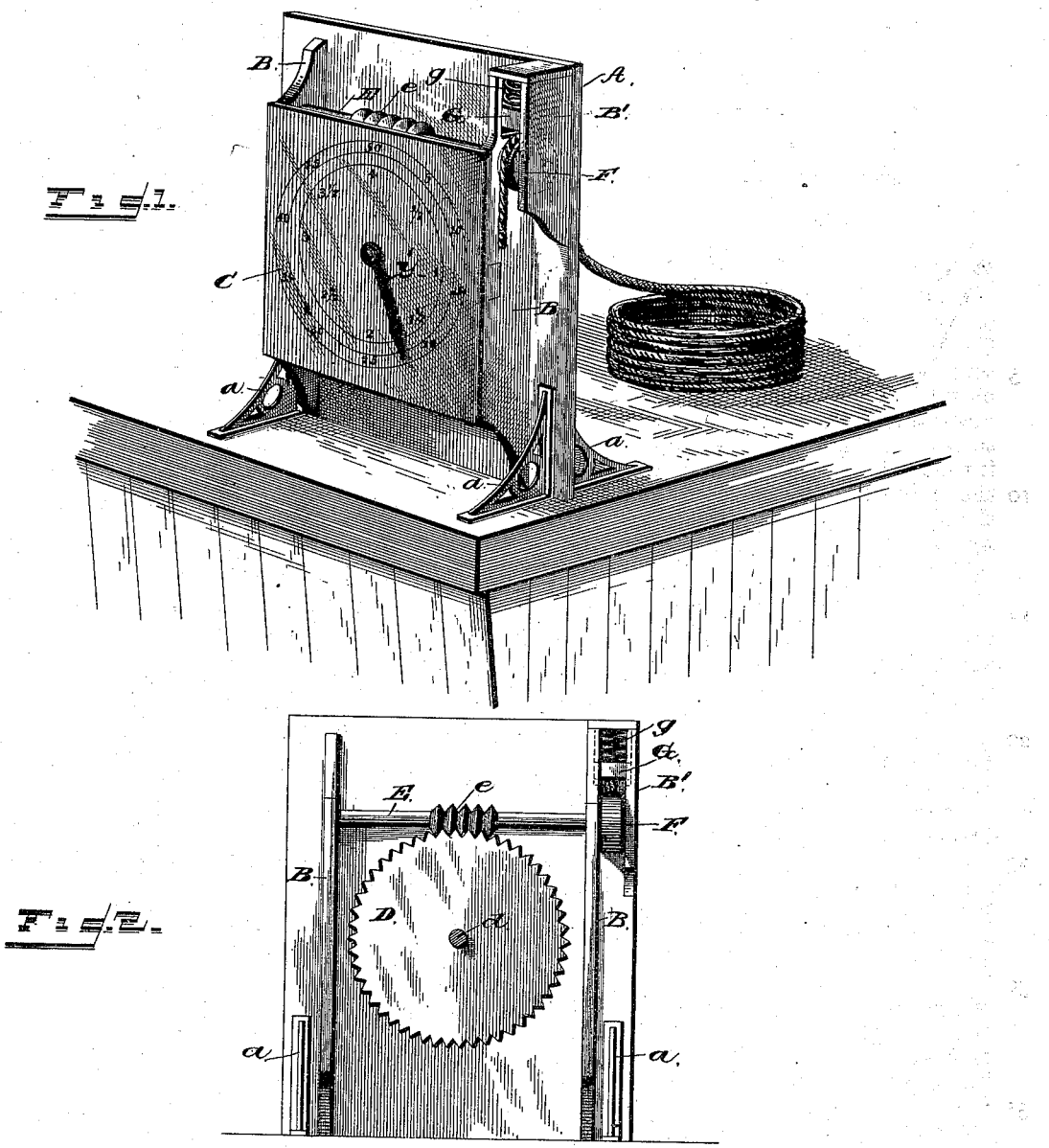

LEVI J. ROSS, OF GOODWIN, DAKOTA TERRITORY.

ROPE-MEASURING DEVICE.

SPECIFICATION forming part of Letters Patent No. 382,193, dated May 1, 1888.

Application filed October 6, 1887. Serial No. 251,637. (No model.)

*To all whom it may concern:*

Be it known that I, LEVI J. ROSS, a citizen of the United States of America, residing at Goodwin, in the county of Deuel and Territory of Dakota, have invented certain new and useful Improvements in Rope-Measuring Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in devices for measuring and indicating the weight of ropes or other cordage.

The same consists in the construction and combination of the parts, as will be hereinafter fully set forth, and specifically pointed out in the claim.

In the accompanying drawings, which illustrate my invention, Figure 1 is a perspective view of a rope-measuring device, the same being constructed in accordance with my improvement, and Fig. 2 is a front view having the dial removed, so as to show the interior construction.

A refers to a suitable back board or support, which may be provided with brackets $a\ a$, for supporting or attaching the same to a counter or shelf. Said back board, A, is provided near its edges with outwardly-projecting side pieces, B B, to the outer edges of which are suitably attached a dial, C, which has marked thereon a series of concentric circles, between which are placed figures indicative of the lineal feet of rope which passes over the operating-roller, as well as figures which indicate the number of pounds in a number of feet indicated by the pointer which travels over the dial, it being of course understood that various dials will be provided to measure ropes of different materials and diameters.

Immediately behind the dial C is journaled upon a pivot, $d$, a serrated wheel, D, the serrations thereof engaging with the threads of a worm, $e$, which is mounted on a shaft, E, which is journaled between the side pieces B B and the side piece B'. The shaft E carries between the side pieces B' and B a wheel, F, which may have either a groove or plain face, and above this wheel F is a spring-actuated sliding block, G, which moves vertically in suitable guides, and is depressed toward the wheel F by a spiral spring, $g$. The pivot $d$ is rigidly secured or keyed upon the serrated wheel D, and the outer end thereof carries a pointer, $i$.

To measure rope of a standard size, one end of the same is passed between the spring pressure-block and the wheel F, and as the same is drawn from the coil it will, by frictional contact, rotate the wheel F, which is rigidly secured to the shaft E, so as to turn the serrated wheel D, so as to cause the hand which moves therewith to indicate upon the dial the number of lineal feet of rope which has passed over the wheel F.

The dial is provided, in addition to the figures which indicate the number of feet, with a series of figures indicative of the weight of rope or cordage—for instance, with one row of figures where the rope is of standard diameter and with others for different diameters, though in practice, as the apparatus is so cheap and simple in construction, measuring and weighing devices for cordage hereinbefore described will only be provided with one series of figures for the lineal measurement and another for the weight, these two measurements being provided, as in some localities cordage is sold by the pound, while in other cases it is sold by length.

The index-hand or pointer can be attached to the shaft $d$, so that it can be turned thereon without moving the shaft $d$, so that it can be readily turned to starting-point when desired.

If desirable, to the rear of the board A may be placed a receptacle, in which a coil of rope can be placed.

I claim—

In a device for measuring rope or cordage, the combination of the vertically-disposed supporting frame-work constructed to form inclosing-cases for the mechanism, as set forth and shown, the upper longitudinally-arranged shaft, carrying a centrally-situated worm and a small plain-faced wheel or roller, F, on one end thereof, a spring-actuated pressure-block mounted directly above the said wheel or roller and acting directly against the face thereof, the serrated disk D, mounted on a transverse shaft, *d*, and in direct connection with the worm on the upper longitudinal shaft, the dial-plate C, through which the transverse shaft *d* extends, provided with two sets of relatively-arranged figures indicative of feet and pounds, and an indicator, *i*, secured to the projecting end of the transverse shaft *d*, whereby—the roller translating motion to the upper longitudinal shaft, and the worm on the said shaft imparting said motion to the serrated disk which revolves the hand—the action is made positive and the measurement accurately registered, substantially as described.

In testimony whereof I affix my signature in presence of two witnesses.

LEVI J. ROSS.

Witnesses:
 H. S. WHITING,
 C. H. ROCK.